US009427811B2

(12) United States Patent
Malka (10) Patent No.: US 9,427,811 B2
(45) Date of Patent: Aug. 30, 2016

(54) ROTARY SLITTER WITH CUTTING INSERT EDGE POSITIONING ARRANGEMENT

(71) Applicant: Iscar, Ltd., Tefen (IL)

(72) Inventor: Asaf Malka, Kfar Vradim (IL)

(73) Assignee: Iscar, Ltd., Tefen (IL)

( * ) Notice: Subject to any disclaimer, the term of this patent is extended or adjusted under 35 U.S.C. 154(b) by 178 days.

(21) Appl. No.: 14/289,862

(22) Filed: May 29, 2014

(65) Prior Publication Data
US 2015/0321269 A1    Nov. 12, 2015

Related U.S. Application Data

(60) Provisional application No. 61/989,562, filed on May 7, 2014.

(51) Int. Cl.
*B23C 5/00* (2006.01)
*B23C 5/08* (2006.01)
*B23C 5/24* (2006.01)
*B23B 5/16* (2006.01)

(52) U.S. Cl.
CPC .  *B23C 5/08* (2013.01); *B23C 5/24* (2013.01); *B23C 5/242* (2013.01); *B23C 5/2472* (2013.01); *B23C 2220/36* (2013.01); *B23C 2245/00* (2013.01); *Y10T 407/1928* (2015.01)

(58) Field of Classification Search
CPC ................................................ B23C 2210/161
See application file for complete search history.

(56) References Cited

U.S. PATENT DOCUMENTS

| | | | | |
|---|---|---|---|---|
| 899,608 | A * | 9/1908 | Newbold | B23B 29/043 407/45 |
| 1,090,205 | A * | 3/1914 | Gorton | B23C 5/2468 407/45 |
| 3,914,841 | A * | 10/1975 | Borgardt | B23C 5/2403 407/81 |
| 4,357,123 | A * | 11/1982 | Zweekly | B23B 27/045 407/110 |
| 4,363,576 | A * | 12/1982 | Zweekly | B23B 27/045 407/109 |
| 4,604,004 | A * | 8/1986 | Armbrust | B23B 27/045 407/110 |
| 6,299,389 | B1 * | 10/2001 | Barazani | B23B 27/04 144/173 |
| 6,319,104 | B1 * | 11/2001 | Emter | B23C 5/006 409/145 |

(Continued)

OTHER PUBLICATIONS

International Search Report dated Aug. 13, 2015 issued in counterpart PCT application (No. PCT/IL2015/050388).

*Primary Examiner* — Will Fridie, Jr.
(74) *Attorney, Agent, or Firm* — Womble Carlyle (57) ABSTRACT

A rotary slitter includes a disc-shaped rotary slitter body having a rotation axis, opposing first and second surfaces, a circumferential surface connecting the first and second side surfaces, and a cutting portion. The cutting portion includes an insert seating construction, a groove formed in the first surface and surrounding the insert seating construction, in a view of the first surface along the rotation axis, and a positioning hole. The rotary slitter further includes a positioning screw mounted to the positioning hole and configured to adjust a position of a cutting edge of a cutting insert mounted to the insert seating construction.

21 Claims, 4 Drawing Sheets

(56) References Cited

U.S. PATENT DOCUMENTS

| | | |
|---|---|---|
| 6,971,823 B2 | 12/2005 | Satran et al. |
| 7,390,150 B2 | 6/2008 | Kocherovsky et al. |
| 2004/0131432 A1* | 7/2004 | Riviere .................... B23C 5/08 407/40 |
| 2004/0161311 A1* | 8/2004 | Satran ..................... B23C 5/08 407/46 |
| 2009/0249607 A1 | 10/2009 | Kadosh |
| 2011/0182678 A1* | 7/2011 | Waggle .................... B23C 5/08 407/49 |
| 2012/0082519 A1 | 4/2012 | Hecht |
| 2013/0022414 A1* | 1/2013 | Athad .................... B23C 5/006 407/44 |
| 2013/0071194 A1 | 3/2013 | Hecht |
| 2014/0013916 A1* | 1/2014 | Athad ................... B23D 61/04 83/676 |
| 2014/0056659 A1 | 2/2014 | Athad |

\* cited by examiner

ROTARY SLITTER WITH CUTTING INSERT EDGE POSITIONING ARRANGEMENT

RELATED APPLICATIONS

The present application claims priority to U.S. Provisional Patent Application No. 61/989,562, filed May 7, 2014, the contents of which are incorporated by reference in their entirety.

FIELD OF THE INVENTION

The subject matter of the present application relates generally to a metal-machining rotary slitter comprising a disc-shaped body configured for rotating around an axis and, more particularly, to a cutting insert edge positioning arrangement of the rotary slitter.

BACKGROUND OF THE INVENTION

In order to achieve high-precision operations, metal-machining tools are known to be configured with cutting insert edge positioning arrangements which allow cutting edges to be desirably positioned.

An example metal-machining tool with a cutting insert edge positioning arrangement is disclosed in U.S. Pat. No. 3,914,841.

SUMMARY OF THE INVENTION

In accordance with a first aspect of the subject matter of the present application, there is provided a rotary slitter comprising a disc-shaped rotary slitter body, a cutting insert comprising a cutting edge, and a positioning screw. The rotary slitter further comprises a circumferentially located cutting portion. The cutting portion comprises an insert seating construction to which the cutting insert is mounted and a groove surrounding the insert seating construction. The groove comprises a positioning hole to which the positioning screw is mounted.

In accordance with another aspect of the subject matter of the present application, there is provided a rotary slitter comprising, in combination: a disc-shaped rotary slitter body comprising a cutting portion which in turn comprises a cutting insert seating construction and a groove surrounding the insert seating construction and comprising a positioning hole; a cutting insert comprising a cutting edge and mounted to the cutting insert seating construction; and a positioning screw mounted to the positioning hole.

In accordance with another aspect of the subject matter of the present application, there is provided a rotary slitter comprising, in combination: a disc-shaped rotary slitter body comprising a cutting portion which in turn comprises a cutting insert seating construction, a groove surrounding the insert seating construction, and a positioning hole; a cutting insert comprising a cutting edge and mounted to the cutting insert seating construction; and a positioning screw mounted to the positioning hole and configured to bias the cutting portion into a different position.

In accordance with another aspect of the subject matter of the present application, there is provided a disc-shaped rotary slitter body comprising a cutting portion which in turn comprises a cutting insert seating construction and a groove surrounding the insert seating construction, the groove comprising a positioning hole.

In accordance with still another aspect of the subject matter of the present application, there is provided a disc-shaped rotary slitter body configured to rotate about an axially extending rotation axis $A_R$ and comprising: opposing first and second surfaces oriented perpendicular to the rotation axis $A_R$; a circumferential surface connecting the first and second surfaces; and a cutting portion located at the circumferential surface; the cutting portion comprising: a cutting insert seating construction; a groove surrounding the insert seating construction in a view of the first surface along the rotation axis $A_R$; and a positioning hole opening out towards the first surface.

In accordance with yet another aspect of the subject matter of the present application, there is provided a disc-shaped rotary slitter body configured to rotate about an axially extending rotation axis $A_R$ and comprising a plurality of cutting portions; each cutting portion comprising a groove; and each groove comprising a positioning hole.

In accordance with an aspect of the subject matter of the present application, there is provided a disc-shaped rotary slitter body comprising a cutting portion which in turn comprises a cutting insert seating construction, a groove surrounding the insert seating construction, and a positioning hole.

In accordance with still another aspect of the subject matter of the present application, there is provided a cutting portion comprising an insert seating construction surrounded by a groove, the groove comprising a positioning hole.

As will be understood, the subject matter of the present application is directed to a cutting insert edge positioning arrangement which uses a positioning screw in a positioning hole for biasing a cutting insert's edge into a desired position. More precisely, for example, the positioning screw can abut a slitter body at one side thereof and a cutting portion at an opposing side thereof, to position the cutting portion and consequently the cutting insert's edge.

Any of the aspects above can be advantageous for providing a rotary slitter, or a slitter body which is a component of such rotary slitter, with a cutting edge positioning arrangement effective and user friendly construction for slitting operations. To elaborate, for example:

- The groove can localize the positioning movement to only the associated cutting portion, allowing effective positioning thereof and reducing undesired positioning of any adjacent cutting portions. While such groove can decrease stability of the cutting portion, due to a weakened connection with the slitter body, it has been found that acceptable machining results are still achievable.
- The positioning hole being located in the groove can reduce the amount of force required to cause the positioning. While access to the positioning hole (e.g., opening out towards a first surface) can be limited, for example in rotary slitters which use multiple adjacent slitter bodies, the ability to effectively adjust the position of a cutting portion can, in certain circumstances, outweigh such disadvantage.
- Particularly effective positioning is believed to be achievable with a specific position of a positioning hole, detailed below.
- A small number of parts: e.g., a cutting portion with a single positioning hole and/or a single clamping hole; or, e.g., a rotary slitter with a single positioning screw per cutting portion and/or clamping screw per cutting portion; can allow user friendly operation (e.g. simplified assembly and/or simplified cutting edge positioning adjustment). While additional positioning holes and/or elements can provide positioning adjustment in non-axial directions, for slitting operations it has been found that axial adjustment only can be sufficiently effective while maintaining a user-friendly design.

It will be understood that the above-said is a summary, and that any of the aspects above may further comprise any of the features described hereinbelow. Specifically, the following features, either alone or in combination, may be applicable to any of the above aspects:

A. A rotary slitter can comprise a slitter body. A rotary slitter can comprise a plurality of slitter bodies. The plurality of slitter bodies can be located adjacent to each other, e.g., in a "gang". The plurality of slitter bodies can be configured to rotate together. The plurality of slitter bodies can be configured to abut each other.

B. A rotary slitter can comprise a positioning screw per cutting portion. The rotary slitter can comprise exactly one positioning screw per cutting portion.

C. A rotary slitter can comprise a cutting insert per cutting portion.

D. A cutting insert can have rake and relief surfaces intersecting at a cutting edge. A cutting insert can be indexable. For example a cutting insert can have an operative cutting edge, rake surface, and relief surface positioned for contacting a workpiece when the insert is mounted to an insert seating construction and at least one non-operative cutting edge, rake surface, and operative relief surface positioned not to contact the workpiece until the insert has been indexed to a new position. An active rake surface can be located closer than an active relief surface to a rotation axis $A_R$ of a slitter body. When mounted to a slitter body, an active rake surface can face a direction of rotation. A cutting edge can extend more along an axial direction than along a rotation direction. A cutting edge can extend axially.

E. A rotary slitter can comprise a clamping screw per cutting portion. The rotary slitter can comprise exactly one clamping screw per cutting portion.

F. A rotary slitter insert cutting edge positioning arrangement can be constituted by a groove, positioning hole and positioning screw.

G. A slitter body insert cutting edge positioning arrangement can be constituted by a groove and a positioning hole.

H. A slitter body can be disc-shaped.

I. A slitter body can be configured to rotate about an axially extending rotation axis $A_R$.

J. A slitter body can comprise opposing first and second surfaces and a circumferential surface connecting the first and second surfaces. The first and second surfaces can be oriented perpendicular to a rotation axis $A_R$.

K. A slitter body can be symmetric about a central plane $P_C$ extending between the first and second surfaces.

L. A slitter body can comprise a cutting portion. A slitter body can comprise a plurality of cutting portions. A cutting portion of a slitter body can be circumferentially located. Stated differently, a cutting portion can be located at a circumferential surface of the slitter body. At least one additional cutting portion or each cutting portion can be located at the circumferential surface. Cutting portions of a slitter body can comprise different grooves and/or different insert seating constructions. It was particularly surprising to find that movement of a cutting portion during positioning can be configured to not significantly alter position of an adjacent cutting portion.

M. A cutting portion can comprise a positioning hole. More precisely, a cutting portion can comprise a groove which in turn can comprise a positioning hole. A cutting portion can comprise exactly one positioning hole opening out towards a first surface. A cutting portion can comprise exactly one positioning hole opening out towards a second surface. A positioning hole, or each positioning hole, can be configured to position a cutting portion (or, more precisely, a cutting edge associated therewith) only in an axial direction.

N. A cutting portion can comprise a clamping hole. More precisely, a cutting portion can comprise a groove which in turn can comprise a clamping hole. It was surprisingly found that even with a clamping screw being immobile relative to the remainder of the cutting portion, even when the clamping hole intersects a groove of the cutting portion, adjustment of the cutting portion did not significantly affect clamping of the cutting insert.

O. A cutting portion can comprise exactly one clamping hole.

P. A clamping hole can extend perpendicular to a rotation axis $A_R$.

Q. A clamping hole axis $A_C$ of a clamping hole can be perpendicular to a rotation axis $A_R$.

R. A clamping hole can open out to the circumferential surface.

S. A clamping hole can be partially formed on one side of a groove and partially formed on the other side of a groove.

T. A clamping hole can comprise a clamping hole threaded portion. The clamping hole threaded portion can be spaced apart from a circumferential surface. The clamping hole threaded portion can be formed in only on a side of a groove which is distal from an insert seating construction.

U. A clamping hole can comprise a clamping hole biasing recess formed at an intersection of a groove and a circumferential surface. The clamping hole biasing recess can have a concave or frustoconical shape.

V. A clamping screw can comprise a clamping head portion and a clamping threaded portion.

W. A clamping head portion can have a tapered shape.

X. A clamping screw can be configured to abut a portion of the slitter body on one side of a groove and the cutting portion on an opposing side of the groove.

Y. A groove can comprise a blind-groove portion comprising groove web material integrally connecting the cutting portion to the slitter body.

Z. A groove can comprise a through-groove portion which is devoid of groove web material between first and second surfaces. A clamping hole can be formed at the through-groove portion.

AA. At least a portion of a groove can comprise groove web material integrally connecting a cutting portion to a slitter body. A positioning hole can be formed in a closest half of the groove web material to a cutting edge.

BB. A cutting portion can comprise a cutting insert seating construction. A cutting portion can comprise exactly one insert seating construction.

CC. A cutting portion can comprise an insert seating construction to which the cutting insert is mounted and a groove surrounding the insert seating construction.

DD. A cutting portion can comprise a groove.

EE. A groove can surround an insert seating construction.

FF. A groove can extend from a first groove end at a rotationally trailing side to a second groove end at a rotationally leading side of an insert seating construction of a cutting portion. More precisely, the first and second groove sides can be located at along the circumferential surface.

GG. A groove can comprise only straight groove portions. The straight portions are believed to allow more effective (i.e. precise) positioning of a cutting portion than curved portions.

HH. A groove can comprise a positioning hole.

II. A positioning hole can open out towards a first surface. A positioning hole can be formed in a groove.

JJ. A positioning hole can comprise a positioning hole threaded portion. The positioning hole threaded portion can be spaced apart from the first surface. The positioning hole threaded portion can also be spaced apart from the second surface.

KK. A positioning hole can comprise a positioning hole biasing recess formed at an intersection of the groove and a first surface.

LL. A positioning axis $A_P$ of the positioning hole can be parallel with the rotation axis $A_R$.

MM. A cutting portion can comprise an additional positioning hole on an opposing side of the cutting portion to allow axial positioning from either side. The positioning hole and the additional positioning hole can be coaxial. The positioning hole and the additional positioning hole can share a common positioning hole threaded portion. The additional positioning hole can comprise a positioning hole biasing recess formed at an intersection of the groove and a second surface.

NN. A positioning hole biasing recess can have a concave or frustoconical shape.

OO. A positioning hole can be located within a central third of a groove.

PP. Each cutting portion can comprise a groove having corresponding features to at least one other cutting portion.

QQ. A positioning screw can comprise a positioning head portion and a positioning threaded portion.

RR. A positioning head portion can have a tapered shape.

SS. A positioning screw can be configured with a length such that when mounted in the positioning hole, an additional positioning screw of the same length cannot be mounted to an additional positioning hole which is coaxial with the positioning hole. Stated differently, a cutting portion or each cutting portion, having opposing positioning holes can be configured for mounting a positioning screw in only one of the two opposing positioning holes.

TT. A positioning screw can be configured to abut a portion of the slitter body on one side of a groove and the cutting portion on an opposing side of the groove.

UU. A positioning screw can be mounted to the positioning hole. The positioning screw can be configured to adjust a position of a cutting edge of a cutting insert mounted to the insert seating construction.

VV. A positioning hole can be located adjacent to a second seating end. More precisely, a cutting insert seating construction can comprise a first seating end opening out to a circumferential surface and extending to a second seating end proximate to a rotation axis $A_R$, wherein a positioning hole is located adjacent to the second seating end.

WW. A positioning hole can be located closer than a cutting insert seating construction to a rotation axis $A_R$.

XX. A positioning hole can be located in a straight groove portion. In a plane perpendicular to a rotation axis $A_R$, an imaginary line forming an angle α of between 80° to 100° (80°≤α≤100°) with the straight groove portion, can intersects a cutting edge. Preferably the angle α is between 87° to 93° (87°≤α≤93°).

BRIEF DESCRIPTION OF THE DRAWINGS

For a better understanding of the subject matter of the present application, and to show how the same may be carried out in practice, reference will now be made to the accompanying drawings, in which.

DETAILED DESCRIPTION

Figure 1A:
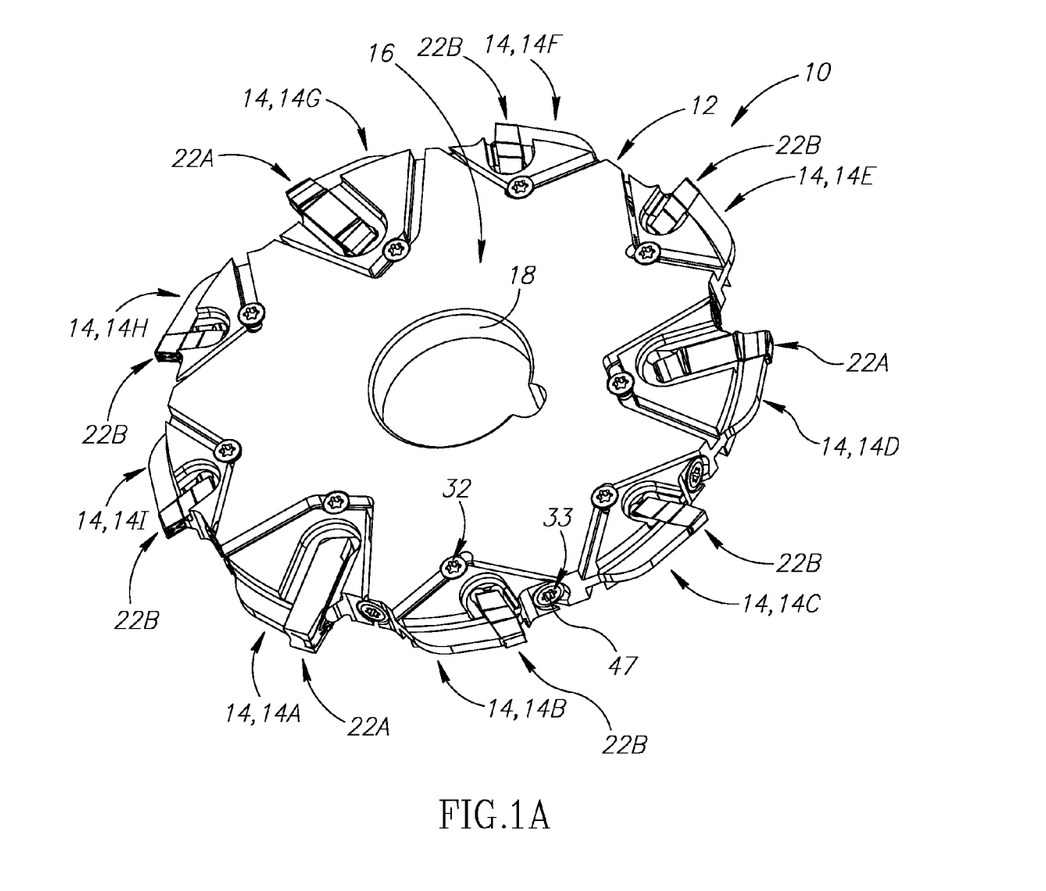
FIG. 1A is a side perspective view of a rotary slitter.
Figure 1B:
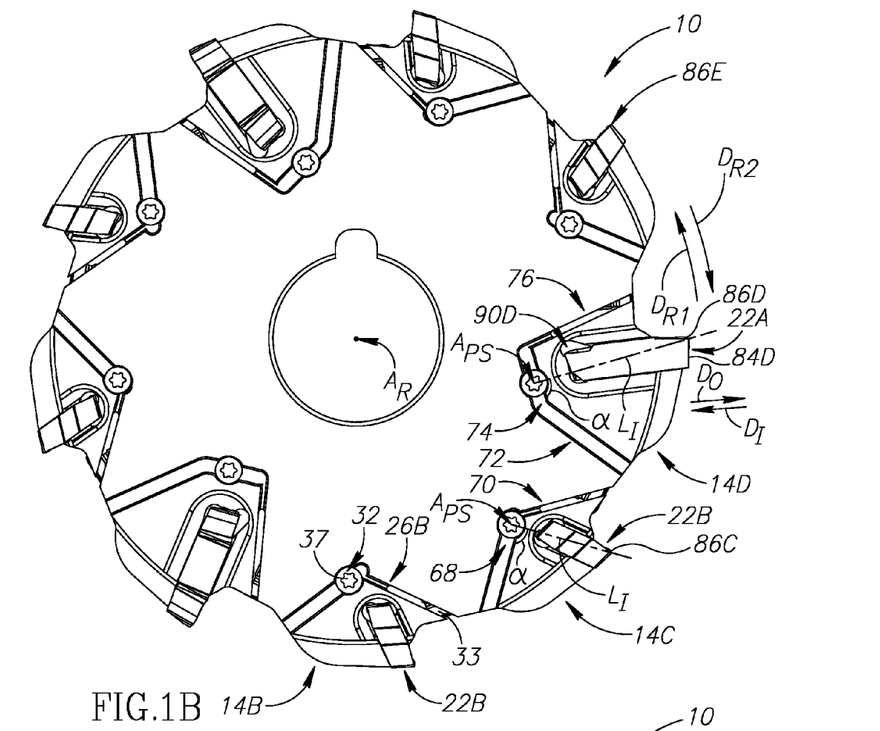
FIG. 1B is a side view of the rotary slitter in FIG. 1A.
Figure 1C:
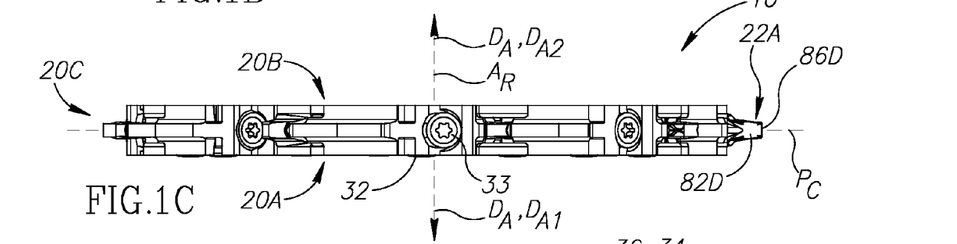
FIG. 1C is a top view of the rotary slitter in FIGS. 1A and 1B.

FIGS. 1A to 1C, illustrate an example rotary slitter 10.

The rotary slitter 10 can comprise a disc-shaped rotary slitter body 12. The slitter body 12 can comprise at least one cutting portion 14.

For example, the slitter body 12 can comprise first, second, third, fourth, fifth, sixth, seventh, eighth and ninth cutting portions 14A, 14B, 14C, 14D, 14E, 14F, 14G, 14H, 14I. References to an element of an exemplary cutting portion may be made below using a similar name (e.g. "first") and suffix (e.g. "A").

The slitter body 12 can also comprise a central annular portion 16 formed with a shaft-receiving hole 18.

Each cutting portion 14 can extend from the annular portion 16.

The slitter body 12 can comprise opposing first and second surfaces 20A, 20B and a circumferential surface 20C connecting the first and second surfaces 20A, 20B. The first and second surfaces 20A, 20B can be oriented perpendicular to a rotation axis $A_R$.

The slitter body 12 can be configured to rotate about the rotation axis $A_R$, which extends axially. More precisely, the rotation axis $A_R$ defines opposite first and second axial directions $D_{A1}$, $D_{A2}$ which are respectively directed away from the first and second surfaces 20A, 20B.

The slitter body 12 can be symmetric about a central plane $P_C$ extending between the first and second surfaces 20A, 20B.

The cutting portions 14 can each comprise identical or corresponding elements. For example, the first, fourth and seventh cutting portions 14A, 14D, 14G are identical and are associated with identical screws and an identical relatively large first cutting insert 22A mounted thereto. The remaining cutting portions 14B, 14C, 14E, 14F, 14H, 14I are identical and are associated with identical screws (the screws also being identical to those associated with the first, fourth and seventh cutting portions 14A, 14D, 14G) and an identical relatively small second cutting insert 22B mounted thereto. The relatively larger and smaller cutting inserts 22A, 22B are examples of corresponding elements, i.e. performing the same basic function but having a different shape (the specific function of the relatively small second cutting insert 22B being that of removing most material from a workpiece, not shown, whereas the relatively larger cutting inserts 22A perform a finishing-shape function). Other corresponding elements are grooves which will be described below.

For conciseness and ease of understanding, descriptions below can be made to one specific element (e.g., the second cutting portion 14B) with the understanding that the same statements apply to the other elements of the same type, or may just be made generally to all such elements (e.g. the cutting portion 14) implying all such elements. Elements or features which are identical may be identified or described using an identical reference character.

Figures 4A, 4B:
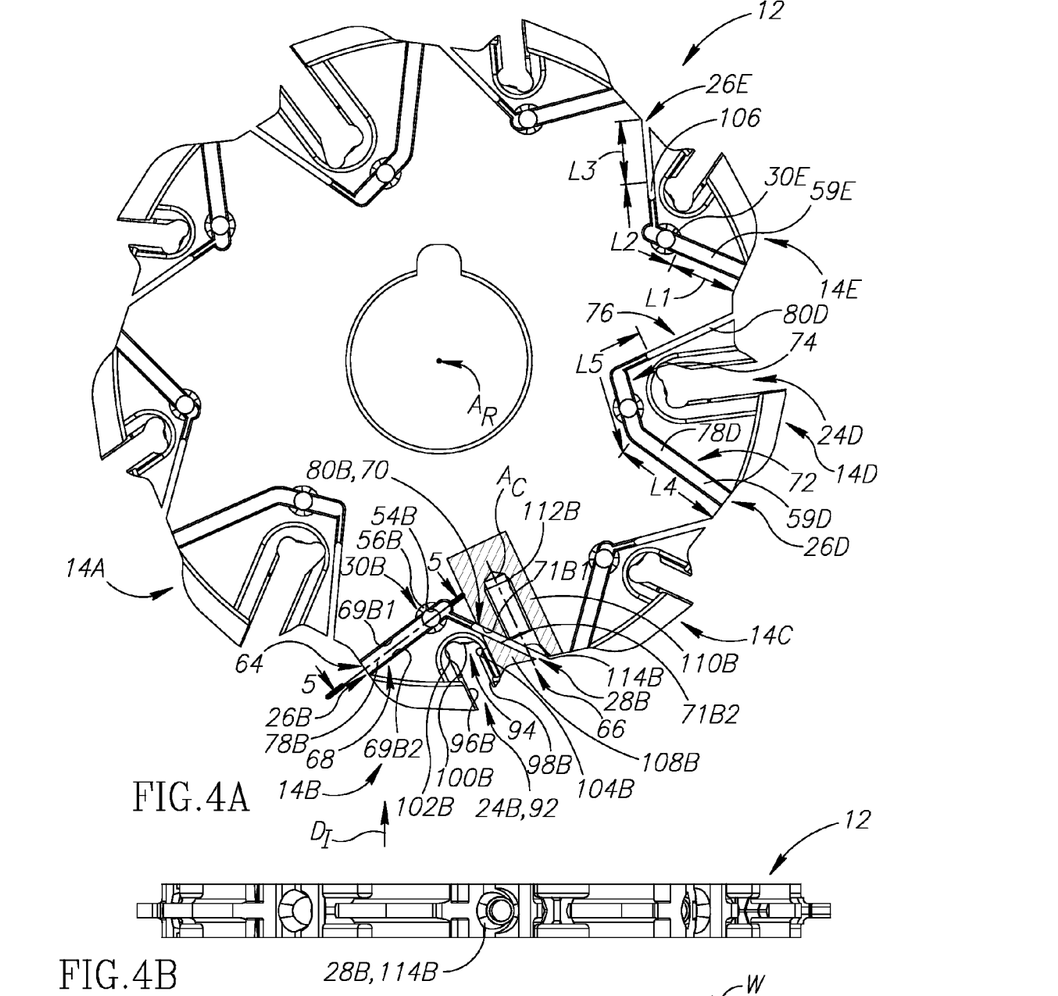
FIG. 4A is a side view of a slitter body of the rotary slitter in FIGS. 1A to 1C.
FIG. 4B is a top view of the slitter body in FIG. 4A.
Figure 6:
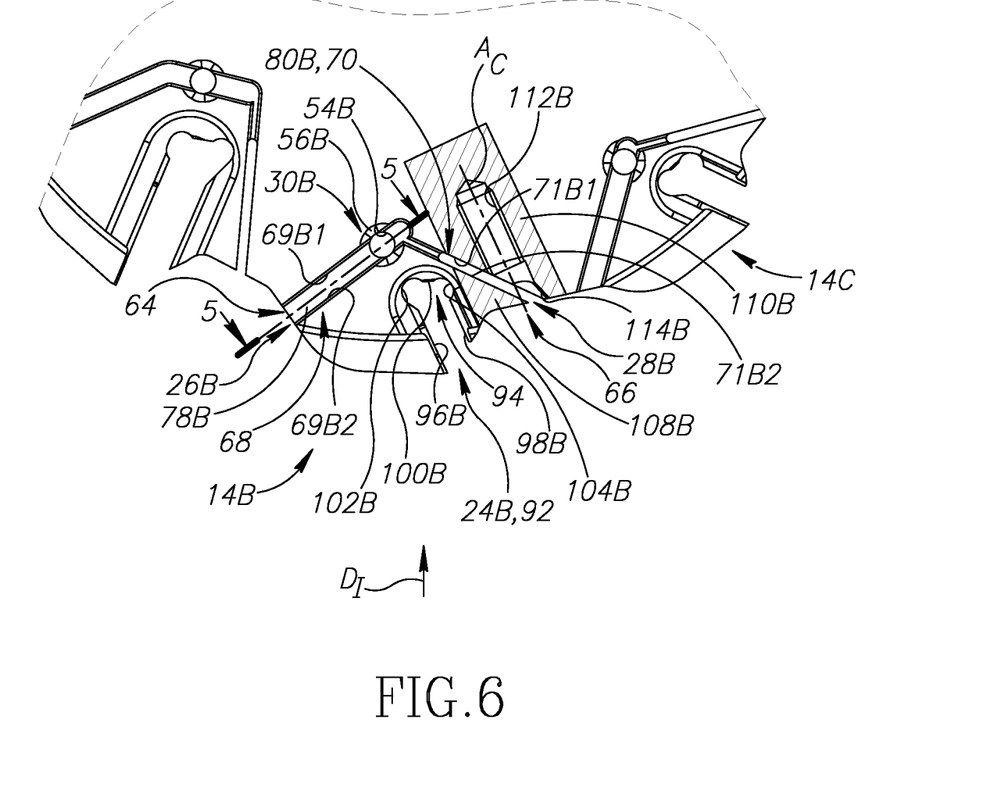
FIG. 6 is an enlarged view of a portion of FIG. 4A.

Referring also to FIGS. 4A and 6, the second cutting portion 14B can comprise a cutting insert seating construction 24B, a groove 26B formed in the first surface 20A and surrounding the insert seating construction 24B in a view of the first surface 20A along the rotation axis $A_R$, and a clamping hole 28B. The groove 26B and cutting insert seasting construction 24B may be formed together to have unitary one-piece construction. As explained further below, the groove can also be formed on the second surface 20B and thus surround the insert seating construction 24B in a view of the second surface 20B along the rotation axis $A_R$, as well.

It will be understood that by surrounding the insert seating construction 24B with a relatively thin (when compared to the remainder of the slitter body 12) construction, localization of positioning movement may be assisted, even though a lessening of stability of the second cutting portion 14B can also result.

Each groove 26B can comprise a positioning hole 30B.

Each positioning hole 30B can comprise a positioning screw 32 mounted therein.

Each clamping hole 28B can comprise a clamping screw 33 mounted therein.

Figure 2:
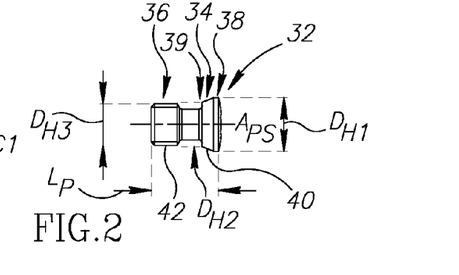
FIG. 2 is a side view of a positioning screw of the rotary slitter in FIGS. 1A to 1C.

Referring to FIG. 2, the positioning screw 32 can extend along a positioning screw axis $A_{PS}$, and can comprise a positioning head portion 34 and a positioning threaded portion 36.

The positioning head portion 34 can comprise a positioning tool receiving arrangement 37 (FIG. 1B) and a tapered shape. More precisely, the positioning head portion 34 can comprise a first positioning head end 38 further from the positioning threaded portion 36 than a second positioning head end 39. The first positioning head end 38 can have a larger first positioning head diameter $D_{H1}$ than a second positioning head diameter $D_{H2}$ of the second positioning head end 39. The positioning head portion 34 can have a positioning outer surface 40 which has a frustoconical shape.

The positioning threaded portion 36 can comprise an external positioning threading 42. The positioning threaded portion 36 can have a smaller positioning threaded portion diameter $D_{H3}$ than at least part of the positioning head portion 34.

Figure 3:
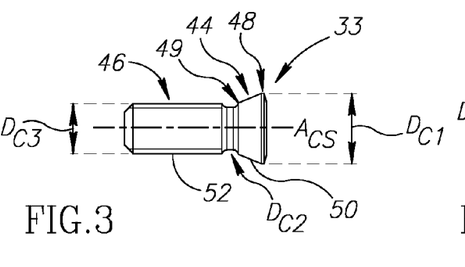
FIG. 3 is a side view of a clamping screw of the rotary slitter in FIGS. 1A to 1C.

Referring to FIG. 3, the clamping screw 33 can extend along a clamping screw axis $A_{CS}$, and can comprise a clamping head portion 44 and a clamping threaded portion 46.

The clamping head portion 44 can comprise a clamping tool receiving arrangement 47 (FIG. 1A) and a tapered shape. More precisely, the clamping head portion 44 can comprise a first clamping head end 48 further from the clamping threaded portion 46 than a second clamping head end 49. The first clamping head end 48 can have a larger first clamping head diameter $D_{C1}$ than a second clamping head diameter $D_{C2}$ of the second clamping head end 49. The clamping head portion 44 can have a clamping outer surface 50 which has a frustoconical shape.

The clamping threaded portion 46 can comprise an external clamping threading 52. The clamping threaded portion 46 can have a smaller clamping threaded portion diameter $D_{C3}$ than at least part of the clamping head portion 44.

Figure 5:
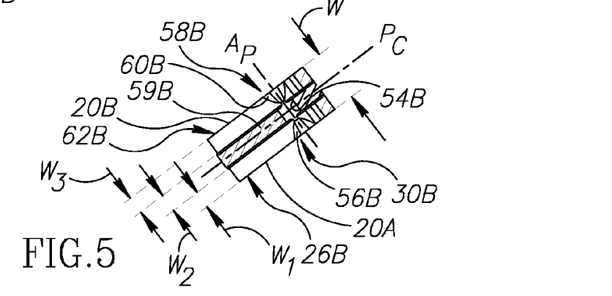
FIG. 5 is a cross section view taken along line 5-5 in FIG. 4A.

Drawing attention to FIGS. 4A, 5 and 6, the positioning hole 30B can extend along a positioning axis $A_P$, and can comprise a positioning hole threaded portion 54B and a positioning hole biasing recess 56B formed at an intersection of the groove 26B and the first surface 20A.

The slitter body 12 can also comprise an additional positioning hole 58B extending coaxially with the positioning hole 30B.

The additional positioning hole 58B can comprise a positioning hole threaded portion, which can be constituted by the same positioning hole threaded portion 54B as the positioning hole 30B (i.e., the positioning hole threaded portion 54B can be shared by the two positioning holes 30B, 58B), and a positioning hole biasing recess 60B formed at an intersection of the groove 26B and the second surface 20B.

An overall width W of the cutting portion 14B can be a sum of first, second and third widths $W_1$, $W_2$, $W_3$, which are measurable parallel to the positioning axis A. Each of the first, second and third widths $W_1$, $W_2$, $W_3$ can constitute a third of a total width of the second cutting portion 14B. More precisely, the first width $W_1$ can be associated with the groove 26B and/or with the positioning hole biasing recess 56B. More precisely, the second width $W_2$ can be associated with the positioning hole threaded portion 54B and/or with groove web material 59B located between the groove 26B and an additional groove 62B. Similar to the first width $W_1$, the third width $W_3$ can be associated with the corresponding additional groove 62B, and/or with the additional positioning hole biasing recess 60B.

A length $L_P$ (FIG. 2) of the positioning screw 32 can correspond to, or be smaller than, a sum of the first and second widths $W_1$, $W_2$.

The length $L_P$ can be equal to or greater than half of the overall width W of the second cutting portion 14B.

A general description of a positioning hole, will now be made, for conciseness, directed to the positioning hole 30B.

The positioning hole biasing recess 56B can have a frustoconical shape, as shown.

The positioning hole 30B can open out towards the first surface 20A. The positioning hole 30B can also open out to the first surface 20A, for example, in embodiments where the positioning hole biasing recess 56B is formed at an intersection of the groove 26B and the first surface 20A, as shown.

To position the second cutting portion 14B, or more precisely the cutting insert 22B held thereby, the positioning screw 32 can be secured to the positioning hole 30B or the additional positioning hole 58B. More precisely, the positioning screw's positioning threaded portion 36 is secured to the positioning hole threaded portion 54B via rotation of the positioning screw 32 using a rotating tool (e.g. a screwdriver, not shown) connected to the positioning tool receiving arrangement 37.

The positioning screw 32 is rotated until the positioning head portion 34 abuts the positioning hole biasing recess 56B and moves the cutting portion 14B to a desired position.

Further constructional features will now be described.

Referring to FIGS. 4A and 6, the groove 26B can extend from a first groove end 64 at the rotationally trailing side to a second groove end 66 at the rotationally leading side of the insert seating construction 24B of the cutting portion 14B.

The grooves shown all can comprise only straight groove portions. For example, the second groove 26B comprises straight first and second groove portions 68, 70. A difference is shown regarding the fourth groove 26D which can comprise straight first, second and third groove portions 72, 74, 76, which can be preferred for larger insert seating constructions 24D.

In any case, straight groove portions can comprise straight walls. For example, with reference to the first and second groove portions 68, 70, the first groove portion 68 can comprise first and second groove portion walls 69B1, 69B2, and the second groove portion 70 can comprise first and second groove portion walls 71B1, 71B2. As shown, the walls of each portion can preferably be parallel to each other.

The grooves can comprise blind-groove portions (e.g., 78B, 78D) comprising groove web material (e.g. see FIG. 5, groove web material 59B, or 59D) integrally connecting the cutting portion to the slitter body.

The grooves can comprise a through-groove portion (e.g., 80B, 80D) which is devoid of groove web material between first and second surfaces 20A, 20B.

Drawing attention to FIGS. 1B and 1C, the cutting inserts (e.g. the fourth cutting insert 22A) comprise rake and relief surfaces 82D, 84D intersecting at a cutting edge 86D at a first end 88D of the fourth cutting insert 22A.

The cutting inserts 22A, 22B are typically made of extremely hard and wear-resistant material such as cemented carbide, either by form-pressing and then sintering carbide powders in a binder or by powder injection molding methods.

The rake surface 82D is positioned for chips (not shown) from a cut workpiece (not shown) to flow thereover.

The cutting edge 86D is positioned such that it is at the operative cutting end of the cutting insert. An identical construction can be found at an opposing second end 90D of the fourth cutting insert 22A, which is currently positioned to be at the non-operative cutting end.

Also shown is a direction of rotation $D_{R1}$ and a direction opposite thereto $D_{R2}$. Further shown is an outward radial direction $D_o$ and an inward radial direction $D_I$ opposite thereto.

It will be understood that axial positioning or movement is defined in the context of the subject matter of the present application, even without being strictly parallel movement with the rotation axis $A_R$ since there is a bending movement involved. Rather the term axial positioning or movement, or a like term, signifies movement along the first and second axial directions $D_{A1}$, $D_{A2}$, as opposed to movement in the direction of rotation $D_{R1}$, direction opposite thereto $D_{R2}$, outward radial direction $D_o$, or the inward radial direction $D_I$.

As shown best in FIG. 1C, the cutting edge 86D, or at least the outermost portion thereof, can extend axially.

Referring to FIGS. 4A and 6, the cutting insert seating construction 24B can comprise a first seating end 92 opening out to the circumferential surface 20C and a second seating end 94 proximate to the rotation axis $A_R$ (i.e. in the inward direction $D_I$). The first seating end 92 of the cutting insert seating construction 24B opens out to the circumferential surface 20C at a first location which is circumferentially spaced apart from a second location where the first groove end 64 opens out to the circumferential surface.

It is believed the positioning hole 30B can be more effective when located adjacent to the second seating end 94, or, stated differently, closer to the second seating end 94 than the first seating end 92. It is also believed that the positioning hole 30B can be more effective when located closer than the cutting insert seating construction 26B to the rotation axis $A_R$.

More precisely, the cutting insert seating construction 24B can comprise lower and upper jaw abutment surfaces 96B, 98B and a rear abutment surface 100B. First and second corner reliefs 102B, 104B can be formed respectively between the lower and upper jaw abutment surfaces 96B, 98B and the rear abutment surface 100B to ensure the second cutting insert 22B only contacts exactly the lower and upper jaw abutment surfaces 96B, 98B and the rear abutment surface 100 when mounted to the second cutting insert seating construction 24B.

In the central plane $P_C$, an imaginary line $L_I$ forming an angle α of between 80° to 100° (80°≤α≤100°) with a straight groove portion (e.g. the first groove portion 68 of the third cutting portion 14C; or the second groove portion 74 of the fourth cutting portion 14D), can intersect an associated operative cutting edge 86C, 86D. Preferably the angle α is between 87° to 93° (87°≤α≤93°). In the examples shown the angle α is 90°. The imaginary line $L_I$ can intersect the positioning screw axis $A_{PS}$.

It is believed preferable that a positioning hole 30 is formed in a closest half of groove web material 59 to a cutting edge 86. To elaborate, referring, for example, to FIG. 4B, the fifth groove 26E of the fifth cutting portion 14E can be theoretically divided into equal third lengths (e.g., first, second and third groove lengths $L_1$, $L_2$, $L_3$). The first groove length $L_1$ extends along a portion of the fifth groove 26E comprising about half of the groove web material 59E. The third groove length $L_3$ extends along a portion of the fifth groove 26E devoid of groove web material. And the second, central, groove length $L_2$ (also called "central third") mostly comprises the groove web material 59E except for a relatively small portion 106 thereof adjacent to the third groove length $L_3$. As shown, the fifth positioning hole 30E is located in the central third $L_2$ of the fifth groove 26E, which is the closest half of the groove web material 59B to the cutting edge 86E (FIG. 1B). To elaborate, about half the groove web material 59E is associated with the first length $L_1$ which can be seen to be further from the cutting edge 86E (FIG. 1B) than the second length $L_2$. It will also be understood that the fifth positioning hole 30E is also in the central third of the fifth groove 26E (i.e. in the second length $L_2$). It is noted that this can also be the case for the other type of cutting portion shown, e.g. the fourth cutting portion 14D having a portion of the fourth groove 26D thereof which comprises groove web material 59D. The portion comprising groove web material 59D comprise a first half (i.e. the first groove portion 72, having a fourth length $L_4$) and a second half (i.e. the second groove portion 74 and a part of the third groove portion 76, having a fifth length $L_5$) which is closer than the first half to the cutting edge 86D (FIG. 1B).

The clamping hole 28B can be formed at the groove 26B. Stated differently, the clamping hole 28B can intersect the groove 26B at its second grove end 66. More precisely, in embodiments where a groove comprises a blind-groove portion and a through-groove portion it is believed beneficial for a clamping hole to intersect the through-groove portion which can be more easily biased than a blind-groove portion.

More precisely, the clamping hole 28B can comprise a first clamping hole portion 108B partially formed on one side of the groove 26B, and a second clamping hole portion 110B formed on the other side of the groove 26B. More precisely, the first clamping hole portion 108B is closer to the insert seating construction 24B than the second clamping hole portion 110B.

The clamping hole 28B can extend perpendicular to the rotation axis $A_R$. The clamping hole 28B can have a clamping hole axis $A_C$ perpendicular to the rotation axis $A_R$.

The clamping hole 28B can comprise a clamping hole threaded portion 112B. The clamping hole threaded portion 112B can be located only on the side of the groove 26B which is distal from the insert seating construction 24B.

The clamping hole 28B can further comprise a clamping hole biasing recess 114B formed at an intersection of the groove 26B and the circumferential surface 20C. The clamping hole biasing recess 114B can have a frustoconical shape as shown.

The cutting insert 22B can be mounted to the second cutting portion 14B such that it contacts only the lower and upper jaw abutment surfaces 96B, 98B and the rear abutment surface 100B.

To clamp the cutting insert 22B to the cutting insert seating construction 24B the clamping screw 33 can be secured to the clamping hole 28B. More precisely, the clamping screw's clamping threaded portion 52 is secured to the clamping hole threaded portion 112B via rotation of the clamping screw 33 using a rotating tool (e.g. a screwdriver, not shown) connected to the clamping tool receiving arrangement 47. Such rotation can bias the first clamping hole portion 108B, or more precisely the upper jaw 98B, against the cutting insert 22B.

The description above includes an exemplary embodiment and details, and does not exclude non-exemplified embodiments and details from the claim scope of the present application.

What is claimed is:

1. A disc-shaped rotary slitter body configured to rotate about an axially extending rotation axis $A_R$ and comprising:
   opposing first and second surfaces oriented perpendicular to the rotation axis $A_R$;
   a circumferential surface connecting the first and second surfaces; and
   a cutting portion located at the circumferential surface;
   the cutting portion comprising:
   a cutting insert seating construction;
   a groove surrounding the cutting insert seating construction in a view of the first surface along the rotation axis $A_R$; and
   a positioning hole opening out towards the first surface; wherein:
   the groove extends from a first groove end at a rotationally trailing side to a second groove end at a rotationally leading side, of the cutting insert seating construction of the cutting portion.

2. The slitter body according claim 1, wherein the positioning hole is formed in the groove.

3. The slitter body according claim 1, wherein the positioning hole comprises a positioning hole threaded portion.

4. The slitter body according to claim 1, wherein the positioning hole comprises a positioning hole biasing recess formed at an intersection of the groove and the first surface.

5. The slitter body according to claim 1, wherein a positioning axis $A_P$ of the positioning hole is parallel with the rotation axis $A_R$.

6. The slitter body according to claim 1, wherein the positioning hole is located within a central third of the groove.

7. The slitter body according to claim 1, wherein the groove further comprises a clamping hole.

8. The slitter body according to claim 7, wherein the clamping hole opens out to the circumferential surface and extends perpendicular to the rotation axis $A_R$.

9. The slitter body according to claim 7, wherein the clamping hole is partially formed on one side of the groove and partially formed on the other side of the groove.

10. The slitter body according to claim 7, wherein the clamping hole comprises a clamping hole threaded portion formed only on a side of the groove which is distal from the cutting insert seating construction.

11. A disc-shaped rotary slitter body configured to rotate about an axially extending rotation axis $A_R$ and comprising:
    opposing first and second surfaces oriented perpendicular to the rotation axis $A_R$;
    a circumferential surface connecting the first and second surfaces; and
    a cutting portion located at the circumferential surface;
    the cutting portion comprising:
    a cutting insert seating construction;
    a groove surrounding the cutting insert seating construction in a view of the first
    surface along the rotation axis $A_R$; and
    a positioning hole opening out towards the first surface; wherein
    the groove comprises a through-groove portion which is devoid of groove web material between the first and second surfaces and the clamping hole is formed at the through-groove portion.

12. The slitter body according to claim 1, wherein the groove comprises a blind-groove portion comprising groove web material integrally connecting the cutting portion to the slitter body.

13. The slitter body according to claim 1, wherein the groove comprises only straight groove portions.

14. The slitter body according to claim 1, further comprising at least one additional cutting portion located at the circumferential surface.

15. The slitter body according to claim 14, wherein each cutting portion comprises exactly one positioning hole opening out towards the first surface.

16. The slitter body according to claim 1, wherein the slitter body is symmetric about a central plane $P_C$ extending between the first and second surfaces.

17. A rotary slitter comprising, in combination:
    a disc-shaped rotary slitter body according to claim 1;
    a cutting insert comprising a cutting edge and mounted to the cutting insert seating construction; and
    a positioning screw mounted to the positioning hole;
    wherein the positioning hole is located in a straight groove portion and, in a plane perpendicular to the rotation axis $A_R$, an imaginary line forming an angle $\alpha$ of between 80° to 100° (80° $\leq \alpha \leq$ 100°) with the straight groove portion, intersects the cutting edge.

18. The rotary slitter according to claim 17, wherein the cutting portion is configured for positioning the cutting edge only in an axial direction along the rotation axis $A_R$.

19. The rotary slitter according to claim 17, wherein the cutting portion comprises an additional positioning hole on an opposing side of the cutting portion to allow axial positioning of the cutting edge from either side.

20. The slitter body according to claim 1, wherein:
    the cutting insert seating construction has a first seating end which opens out to the circumferential surface;
    the groove has a first groove end which opens out to the circumferential surface; and
    the first seating end opens out to the circumferential surface at a first location which is circumferentially spaced apart from a second location where the first groove end opens out to the circumferential surface.

21. A disc-shaped rotary slitter body configured to rotate about an axially extending rotation axis $A_R$ and comprising:
    opposing first and second surfaces oriented perpendicular to the rotation axis $A_R$;

a circumferential surface connecting the first and second surfaces; and a cutting portion located at the circumferential surface;

the cutting portion comprising:

a cutting insert seating construction;

a groove surrounding the cutting insert seating construction in a view of the first surface along the rotation axis $A_R$; and a positioning hole opening out towards the first surface; wherein:

the groove and the cutting insert seating construction are integrally formed together to have unitary one-piece construction.

* * * * *